(12) United States Patent
Braunstein et al.

(10) Patent No.: US 11,568,133 B2
(45) Date of Patent: Jan. 31, 2023

(54) METHOD AND APPARATUS FOR DETECTING ANOMALIES IN MISSION CRITICAL ENVIRONMENTS

(71) Applicant: imVision Software Technologies Ltd., Ramat Gan (IL)

(72) Inventors: Liora Braunstein, Tel Aviv (IL); Keren Cohavi, Tel-Aviv (IL); Yoav Spector, Ramat Gan (IL); Kiril Lashchiver, Kiryat Ono (IL)

(73) Assignee: Intuit Inc., Mountain View, CA (US)

( * ) Notice: Subject to any disclaimer, the term of this patent is extended or adjusted under 35 U.S.C. 154(b) by 209 days.

(21) Appl. No.: 16/710,581

(22) Filed: Dec. 11, 2019

(65) Prior Publication Data

US 2020/0184148 A1      Jun. 11, 2020

Related U.S. Application Data

(60) Provisional application No. 62/777,781, filed on Dec. 11, 2018.

(51) Int. Cl.
| | |
|---|---|
| *G06F 40/205* | (2020.01) |
| *G06K 9/62* | (2022.01) |
| *G06F 40/237* | (2020.01) |
| *G06V 30/414* | (2022.01) |

(52) U.S. Cl.
CPC .......... *G06F 40/205* (2020.01); *G06F 40/237* (2020.01); *G06K 9/6217* (2013.01); *G06V 30/414* (2022.01)

(58) Field of Classification Search
None
See application file for complete search history.

(56) References Cited

U.S. PATENT DOCUMENTS

2017/0063888 A1* 3/2017 Muddu ................ H04L 41/145
2018/0270261 A1* 9/2018 Pande ................. H04L 63/1425

OTHER PUBLICATIONS

Hu, Yibo, Dinghua Zhang, Guoyan Cao, and Quan Pan. "Network data analysis and anomaly detection using CNN technique for industrial control systems security." In 2019 IEEE International Conference on Systems, Man and Cybernetics (SMC), pp. 593-597. IEEE, 2019. (Year: 2019).*
What is Statistical Language Modeling (SLM), url: https://homepages.inf.ed.ac.uk/lzhang10/slm.html, Nov. 15, 2019.

* cited by examiner

*Primary Examiner* — Frank D Mills
(74) *Attorney, Agent, or Firm* — Ferguson Braswell Fraser Kubasta PC

(57) ABSTRACT

A system and method for detecting anomalies in mission-critical environments. The method includes: parsing at least one received data set into a text structure; isolating a protocol language of the at least one received data set, wherein the protocol language is a standardized pattern for communication over at least one protocol; generating at least one document from the contents of the received at least one data set, wherein the at least one document includes at least one parsed text structure referencing a unique identifier, and wherein the at least one parsed text structure is organized within the at least one document according to a natural language scheme; detecting insights in the generated documents; extracting rules from the detected insights; and detecting anomalies by applying the extracted rules.

18 Claims, 8 Drawing Sheets

METHOD AND APPARATUS FOR DETECTING ANOMALIES IN MISSION CRITICAL ENVIRONMENTS

CROSS-REFERENCE TO RELATED APPLICATIONS

This application claims the benefit of U.S. Provisional Application No. 62/777,781 filed on Dec. 11, 2018, the contents of which are hereby incorporated by reference.

TECHNICAL FIELD

The present disclosure relates to techniques for detecting anomalies in mission critical environments, including API implementations, and, more particularly, to techniques for detecting anomalies in communication networks using network language processing.

BACKGROUND

Machine-to-machine communication is widespread over many systems, environments, and disciplines. Financial and banking systems, applying transactions and services, industrial (SCADA) environments, where different machines communicate with each other, communication networks, telecommunication networks, and other systems, each implement machine-to-machine communication via unique configurations and for unique purposes.

Machine-to-machine communication may also be implemented using Application Programming Interfaces (APIs). APIs allow for the development of software compatible with existing systems by standardizing the resources, functions, and other development elements available to programmers. By distributing an API, a software developer can expand the potential uses of an application to include integration with other applications. An example of an API application is a software interface provided by a weather forecasting organization which allows web developers to include a weather module, maintained by the weather forecasting organization, in a website.

Many environments including, without limitation, financial systems, are mission-critical environments. Ensuring correct continuing operation of such systems is as much a part of employing such systems as is the initial implementation. In such environments, anomalies may be classified into two major categories: operational and intentional. Operational anomalies occur due to malfunctions or failures in certain elements of a system, bugs, and so on. Intentional anomalies are usually caused by cyberattacks. As anomalies may imply substantial impact in mission-critical environments, detecting anomalies, preferably in real-time, is crucial to the success of continued operations.

Solutions to anomaly-detection problems in mission-critical environments employing network language processing (NeLP) may be found in the related art. The application of NeLP methods to anomaly detection first requires consideration of an exchange between machines as a "conversation," conducted in a "language" known to the machines. In such a case, specifically, the communication protocol over which the machines communicate, or the channel and protocols standardized by an API, is the "language". To further the goal of solving anomaly-detection problems using NeLP, tools from the natural language processing (NLP) discipline can be applied to detect anomalies in mission critical environments and to increase the system's detection rate and to reduce its false alarm rate.

Further advancing the language-based approach to anomaly detection by protocol analysis, statistical language modeling (SLM) is a technique used to estimate the distribution of letters, words, or phrases in natural language as accurately as possible. The SLM approach aims to estimate the likelihood that sequences of words appear in the language (i.e., estimate the probability distributions over all possible sentences in the language). The probability estimation of different words and word sequences can highlight patterns of behavior of the communications in the network, or of communications via channels standardized by an API, in the same manner as the technique might estimate the likelihood that a pattern of words recurs in a novel. Applying patterns detected may lead to generation of rules which may describe the normal behavior of the network.

Anomaly detection techniques may also be applied to improve the security of API implementations. As the percentage of web-enabled applications containing exposed APIs increases, the amount of API surface area vulnerable to attack is expected to increase as well. Current API security techniques include the manual patching of bugs and backdoors. This technique requires significant time and effort, as bugs and backdoors must be identified, fixes must be created, and those fixes must be pushed to an API update. Furthermore, as client software may depend on one particular version of an API, altering the structure or resources of the API may cause discontinuities in client application availability.

Two major measures are used to indicate the quality of an anomaly detection system, the false alarm rate, the number of times an anomaly detection mechanism indicates an anomaly, where in reality the tested system performs well, divided by the total number of anomaly indications, and the miss detection rate, the ratio between the number of times anomalies were missed by the detection mechanism and the total numbers of anomalies that occurred. The target is, of course, to minimize these two numbers.

It would therefore be advantageous to provide anomalies detection solutions for mission critical networks and especially telecommunications networks.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for detecting anomalies in mission-critical environments. The method comprises the steps of parsing at least one received data set into a text structure; isolating a protocol language of the at least one received data set, wherein the protocol language is a standardized pattern for communication over at least one protocol; generating at least one document from the contents of the at least one received data set, wherein the at least one document includes at least one parsed text structure referencing a unique identifier, and wherein the included at least one parsed text structure is organized within the at least one document according to a natural language scheme; detecting insights in the generated documents; extracting rules from the detected insights; and detecting anomalies by applying the extracted rules.

Certain embodiments disclosed herein also include a non-transitory computer readable medium, having stored thereon instructions for causing a processing circuitry to execute a process, the process comprising parsing at least one received data set into a text structure; isolating a protocol language of the at least one received data set, wherein the protocol language is a standardized pattern for communication over at least one protocol; generating at least one document from the contents of the received at least one data set, wherein the at least one document includes at least one parsed text structure referencing a unique identifier, and wherein the included at least one parsed text structure is organized within the at least one document according to a natural language scheme; detecting insights in the generated documents; extracting rules from the detected insights; and detecting anomalies by applying the extracted rules.

Certain embodiments disclosed herein also include a system for detecting anomalies in mission-critical environments. The system comprises a processing circuitry and a memory, the memory containing instructions that, when executed by the processing circuitry, configure the system to parse at least one received data set into a text structure; isolate a protocol language of the at least one received data set, wherein the protocol language is a standardized pattern for communication over at least one protocol; generate at least one document from the contents of the received at least one data set, wherein the at least one document includes at least one parsed text structure referencing a unique identifier, and wherein the at least one parsed text structure is organized within the at least one document according to a natural language scheme; detect insights in the generated documents; extract rules from the detected insights; and detect anomalies by applying the extracted rules.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Figure 1:
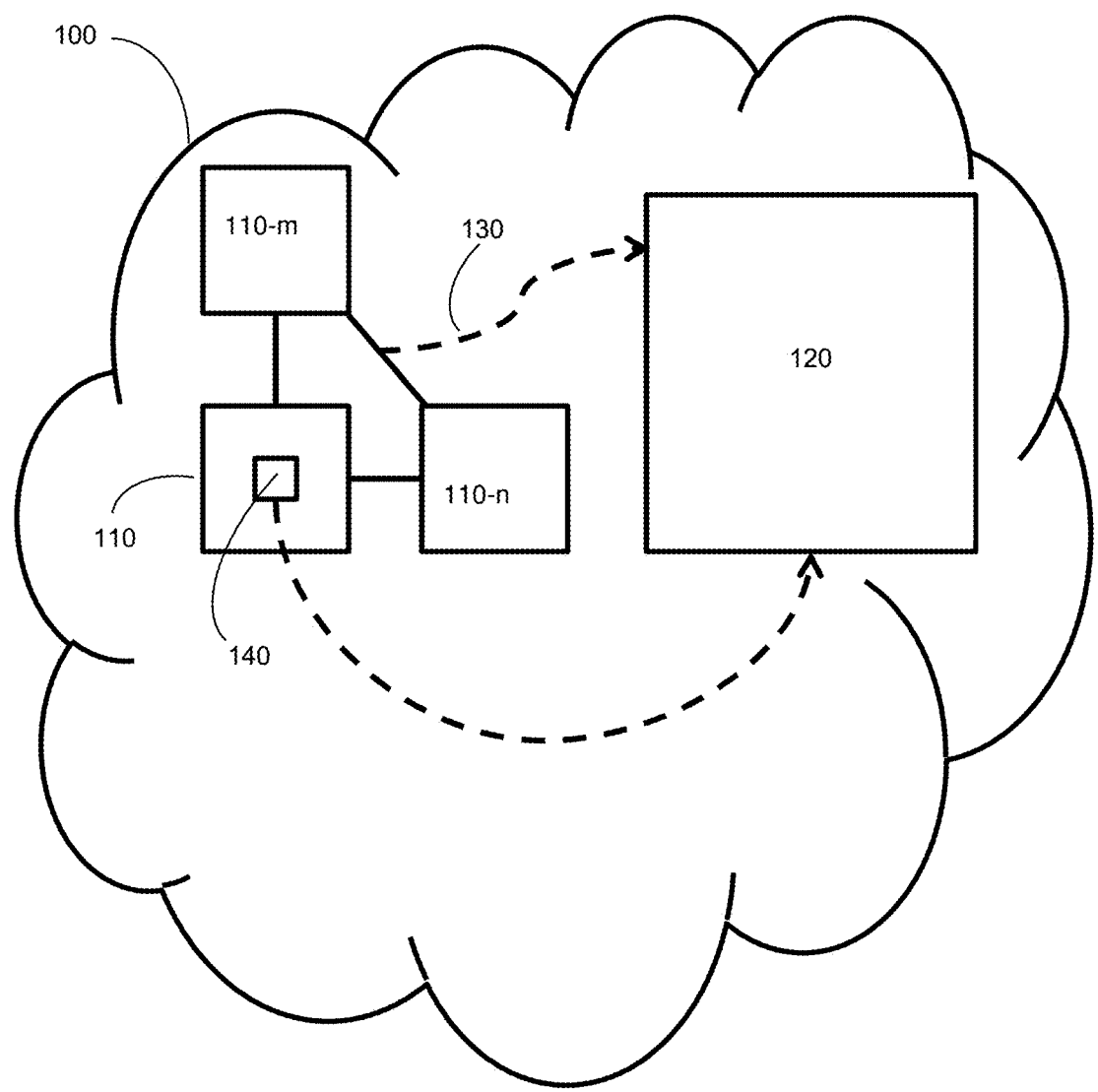
FIG. 1 is a diagram illustrating a mission-critical network, and is utilized to describe the various embodiments.

FIG. 1 is an example diagram illustrating a mission-critical network 100 utilized to describe the various embodiments. In an embodiment, the mission critical-network 100 may be configured to include at least two machines 101, communicating with one another via a protocol including, without limitation, industrial machine communication protocols, mobile device communication protocols, wired communication protocols, and the like. Further, the mission-critical network 100 may be configured such that the at least two machines 101 communicate with one another via applications based on an API using the communication channels and methods standardized by the API. The network 100 may include, for example, a financial and banking network, an industrial (e.g., SCADA) network, a telecommunication network, and the like.

The network 100 may be further configured to include an analytic system 120 configured to receive information regarding the API, APIs, or communication protocol or protocols employed by the machines 110 and to extract information related to data exchanged between the machines 110. A machine 110 may be any server in the network 100. The application of SLM anomaly-detection techniques in such a system including API transactions may enable the detection and mitigation of API-specific cyberattacks. As an example, an attacker may exploit an API by manipulating the API to bypass a credentials verification step, allowing the attacker to access sensitive information using valid credentials, but without verifying his or her identity.

In an embodiment, the analytic system 120 may be configured to receive and analyze communications between two or more machines 110 by "tapping" or intercepting 130 a communication connection between the machines 110.

The "tap" may be a stalling intercept process, wherein the communication between the machines 110 is paused for the duration of analysis. The "tap" may also be a duplicative process, wherein the communication between the machines 110 is duplicated and the duplicate communication is analyzed, allowing the original communication to proceed from node to node during analysis. The "tapping" or interception of a communication connection between the machine 110 provides for the real-time analysis of individual communicative elements, allowing the analytic system 120 to receive data, analyze content and context, and develop new rules on a persistent basis.

In an embodiment, the analytic system 120 may be configured to receive and analyze communications by receiving a block of aggregated data packets from a plug-in 140 installed in each machine 110. In an embodiment, the plug-in 140 may be configured to log communication data to and from the machine 110 in which the plug-in 140 is active. Such data includes contents of logged communication packets and context information, such as the order of communication, the delay between communications, and the like. The plug-in 140 may be realized in software, firmware, hardware, or combination thereof.

In an embodiment, each plug-in 140 may be configured to transmit logged communication information to the analytic system 120 at various intervals based on factors. Such factors may include, without limitation, time-intervals, communication counts, communication content or context triggers, and the like. The batching of communication information provides for a standardized procedure for collecting, transmitting, and receiving communication data for analysis, allowing the analytic system 120 to better manage analytic resources and to schedule analytic tasks. Further, the batching of communication information provides for large datasets, which may allow the generation of refined rules based on the extraction of patterns supported by volumes of data.

In an embodiment, the analytic system 120 may be configured to generate anomaly-detection events based on patterns extracted from the received content and context data. In an embodiment, the analytic system 120 may be configured to employ statistical language modeling (SLM) techniques to detect patterns in the received content and context data. The techniques employed to generate anomaly-detection rules may include the generation, isolated analysis of, and clustered analysis of unigrams, bigrams, and higher-order N-grams, constructed from content data, context data, or a combination of the two.

In an example, the analytic system 120 may receive data regarding communications between two machines 110. The second node immediately dispatches a G-type packet upon receiving a F-type packet from the first node. In the example, a bigram analysis of the two packets, where "F-type" and "G-type" are the "phrases" within the bigram, may lead to the generation of a rule specifying that the dispatch of a packet type other than "G-type" after receipt of an "F-type" packet is anomalous.

Figure 2:
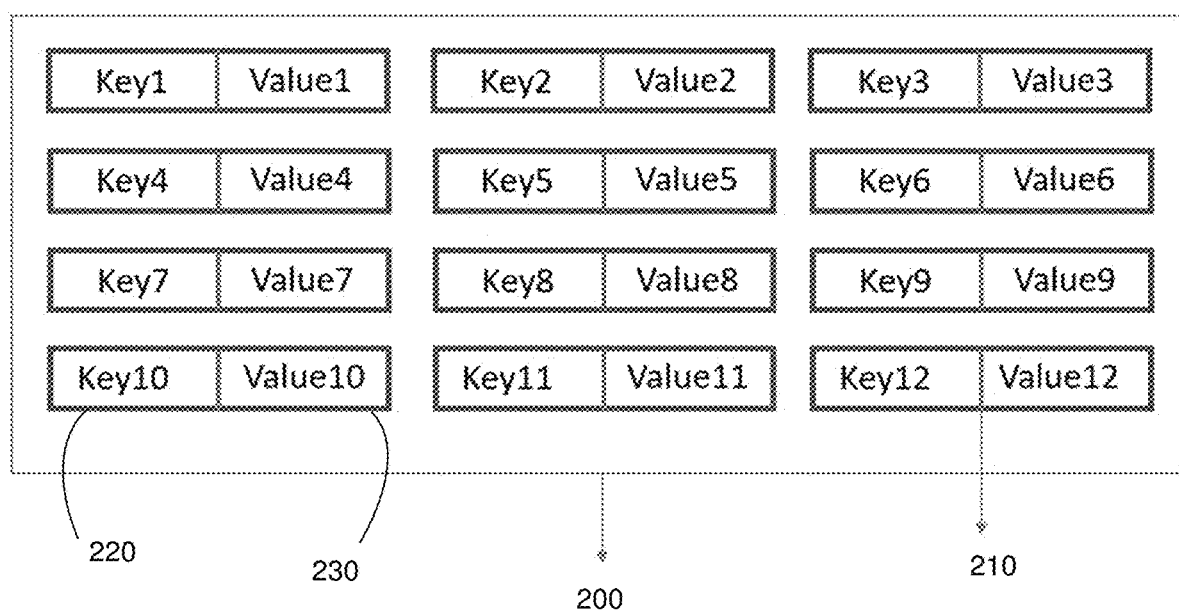
FIG. 2 shows a generic scheme of a packet, according to an embodiment.

FIG. 2 shows a generic scheme of a packet 200. As indicated by the arrows, the entire block is the packet 200, which consists of a sequence of information elements 210. In an example embodiment, the sample packet contains twelve information elements 210. In the example embodiment, each information element includes a tuple, the tuple including a "key" 220 and a "value," 230 where the key 220 is the information element's name, and the value 230 is the content of the information element 210 in the specific packet 200.

In an example embodiment, the "key" may be "message code" and the "value" may be "32." In an example embodiment, specific message codes may indicate a packet's purpose. In an example embodiment, 32 in the GTP protocol may stand for "create session request message." As described, the components illustrated in the drawing may be viewed as language building blocks. In an embodiment, the packet in the drawing may be the "sentence," while the sequence of information elements may be a sequence of "words." In an embodiment, each information element may be used as an entity. In an embodiment, only the keys may be used as an entity.

Figure 3:
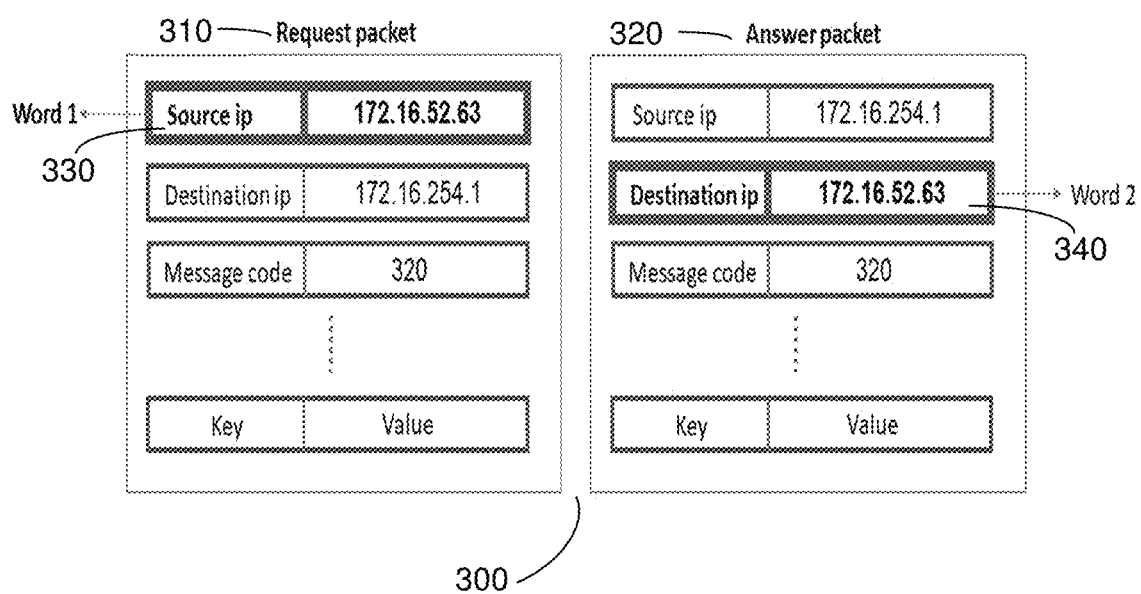
FIG. 3 shows an illustration of two packets, including a request packet and a response packet, according to an embodiment.

FIG. 3 shows an illustration of two packets 300 including a request packet 310 and a response packet 320. In an example embodiment, some information elements are explicitly described. The arrows point at two information elements, one from each packet, demonstrating a possible choice of representation that serves as an input for the bigram model construction. In the example embodiment, an example of choosing to model the distribution of pairs of words may be found, where the first word 330 is taken from a request packet 310, and the second word 340 is taken from an answer packet 320.

In the example embodiment, a data sample includes the pair (word 1, word 2). In the example embodiment, based on the information elements, the bigram model constructed based on a large data set of packets similar to those shown may yield the rule: "given that the request packet has an information element with a key called "source IP" and the value "172.16.52.63," it is with a probability of 1 that the answer packet will have an information element with a key called "destination IP" and the same value "172.16.52.63." In the example embodiment, where such results present for any value X (that is, the above conditional probability applies for any IP address), it may be shown that the rule can be improved to have a generic formulation, that the source IP of the request packet always equals the destination IP of its corresponding answer packet.

Figure 4:
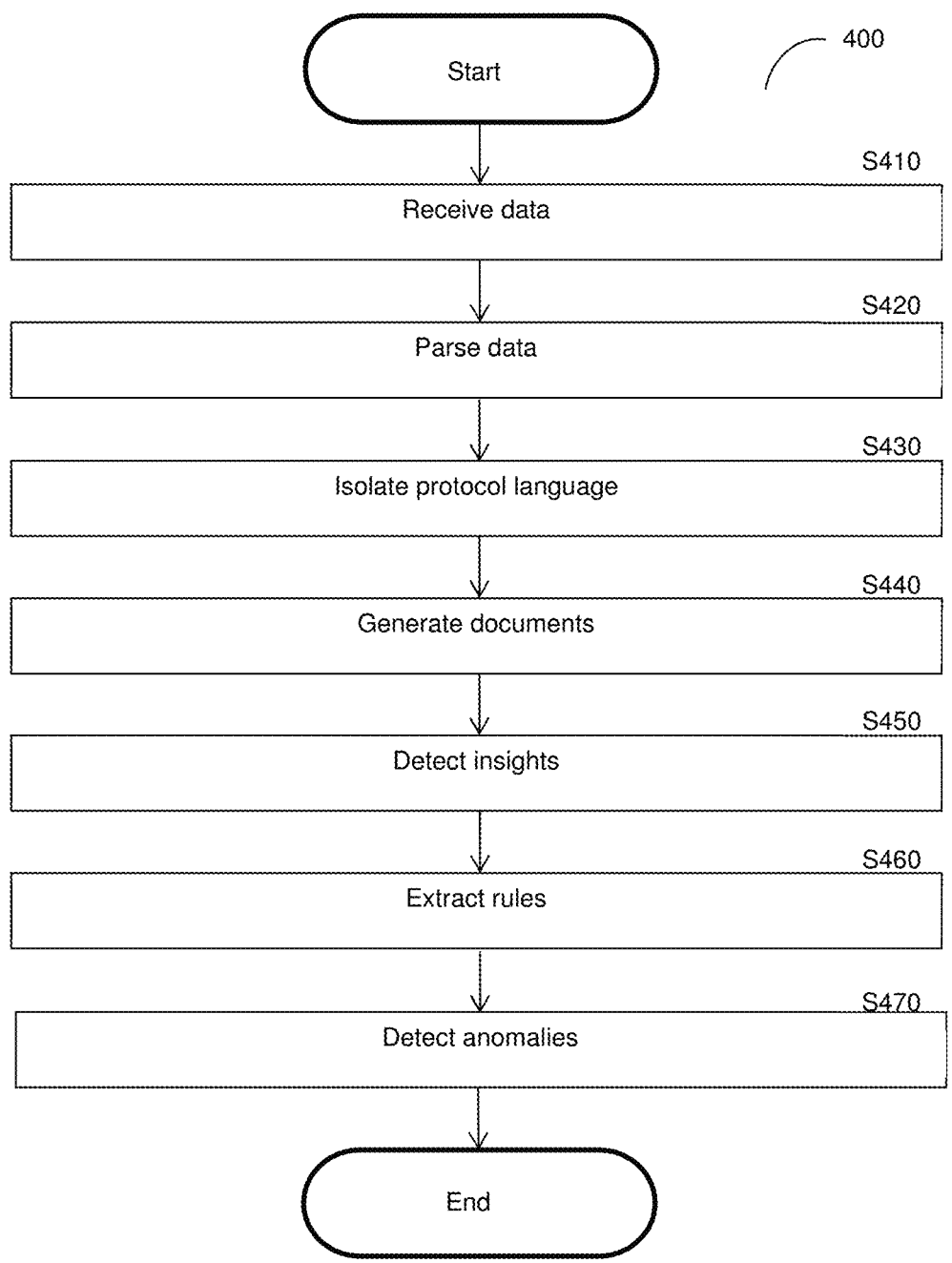
FIG. 4 is a flowchart illustrating a process of generating anomaly-detection rules from received data using NLP techniques, according to an embodiment.

FIG. 4 is an example flowchart 400 illustrating a method of generating anomaly-detection rules, according to an embodiment.

At S410, at least one data set is received. The received data set may be, without limitation, packets, messages, or other data units containing at least one information element. The received data may be a part of a communication procedure and may identify one or more users or user devices. Furthermore, the received data may be a part of a communication protocol.

In an example, the received data may be a packet containing key-value information element pairs. Of the key-value information element pairs contained in the received data packet, one information element may contain an identifier describing a specific user or user device. In the example embodiment, the received data packet may be a packet dispatched in a wireless communication procedure, such as a TCP handshake. Furthermore, in the example embodiment, the received data packet may be a part of a communication protocol, such as TCP/IP.

At S420, the received data is parsed into a network language, consisting of elements paralleling a natural language. Specifically, the received data may be parsed into words, sentences, paragraphs, and the like, language features for which NLP techniques are established. The parsing of received data into an NLP-ready body of language may include the specification of certain types a of data as equivalents of words, sentences, paragraphs, documents, and the like. The parsing of received data into an NLP-ready body of language may include the parsing of information elements as words, the parsing of packets or messages as sentences, and the parsing of data exchanges within a procedure as paragraphs.

In an example embodiment, the parsing of data into NLP-ready bodies of language may be applied to data received in a mobile network. In the example, the individual messages within the mobile network may be viewed as the "sentences" of the "network language," while the information elements comprising the messages may be viewed as "words." While the individual information elements may include multiple sub-elements, such as a key and a value, the combination of the sub-elements into the singular information element may be viewed as the "word" in the network language. In the example, the messages transmitted within the mobile network, viewed as "sentences," may contain one or more information elements, viewed as "words."

In addition, in the example embodiment, messages exchanged within a mobile network may correspond with one or more procedures. For example, the mobile network may include a predefined procedure called "Create Session" which allows a user to initiate a voice call session with another user. The predefined "Create Session" procedure may include one or more messages, exchanged in sequence, describing session-relevant parameters such as, without limitation, users, user device identifications, message data contents, and the like. In the network language equivalence model, messages exchanged within a procedure may comprise a paragraph. Within the paragraph, messages, viewed as "sentences" may be arranged according to various factors including, without limitation, timestamps, predefined message-exchange sequences, and the like.

At S430, the protocol language is isolated. The protocol language may be equated to the language in which a body of natural-language text is written. The language isolated may be a network language constructed from pre-defined messages, sessions, and procedures used in a given communication protocol. In an example, the network of interest may be a mobile network and the communications within the mobile network may be governed by a set of pre-defined messages, procedures, and sessions specific to the protocol, which may be viewed as the "language" in which the participants in the mobile network communicate.

The isolation of the protocol language may allow for the extraction of insights from the "documents" generated at S440, in subsequent procedures, in light of the protocol language isolated. The isolation of the protocol language may be achieved by analysis of the data parsed at S420, review of pre-defined protocol manuals, research papers, and the like, similar methods, and any combination thereof.

At S440, "documents," or sets of "words," "sentences," and "paragraphs" related to a unique identifier, are generated based on the data received at S410 and parsed at S420. In addition to equivalents to words, sentences, and paragraphs, the messages exchanged concerning a user may be, at the document generation phase S440, consolidated and parsed as a single "document" in the network language model. In an example, every message exchanged to or from a user may include an information element containing the user's unique ID.

At the document generation phase S440, the messages containing the user's unique ID may be appended to a "document" specific to the user identified. The organization of "words," "sentences," or "paragraphs" within the "document" may be achieved by consideration of factors including, without limitation, message timestamps, pre-defined message ordering sequences, message contents, and the like. Messages between users may appear in "documents" relating to multiple users, and the overlaps between "documents" may be maintained without deviating from the scope of the described embodiments. The documents generated by the document generation process at S440 may serve as the information corpus, which may serve as data inputs for algorithms subsequently applied.

It may be noted that the protocol language isolation phase S430 and the document generation phase S440 may occur one before the other, in any order, or may occur concurrently, with no loss of generality or departure from the scope of the embodiments described.

At S450, insights are detected in the documents generated at S440. The detection of insights may be achieved through a variety of natural language processing (NLP) techniques including, without limitation, statistical language modeling (SLM), word embedding, other similar techniques, and a combination thereof. The insights detected at S450 may be subsequently applied to the generation of rules and the detection of anomalies.

A common paradigm for acquiring these insights is based on the distributional hypothesis of words in natural text, stating that words that appear in similar contexts have similar meanings.

The detection of insights at S450 may be achieved using NLP techniques including statistical language modeling (SLM). SLM models estimate the distribution of natural language by attempting to predict the likelihood of certain word sequences within a language. SLM models may be applicable to network language implementations as well as natural language applications. The application of SLM techniques to network language systems may highlight patterns of behavior within the communication network, leading to the development of rules and the application of the developed rules to anomaly detection.

In an example, SLM techniques may be applied to network language implementations in the analysis of "documents" created for single-user transactions with a server. In the example embodiment, an analyzed "document" may contain a set of "paragraphs" describing communications between the user and the server according to predefined procedures. Each paragraph may contain multiple "sentences," where each "sentence" is a message or packet within the communication transaction and where each "sentence" contains one or more information element "words." In the example, a particular paragraph describing a synchronize-acknowledge exchange, as might be found in a TCP protocol, might contain sentences with first information elements alternating between a "synchronize" request from a user, followed by an "acknowledge" response from the server. In the embodiment, SLM techniques might be applied to the paragraph in question by the construction of bigrams containing the first information element of each consecutive message or "sentence." By constructing a set of bigrams from the first information elements of each consecutive message, application of SLM techniques might indicate the presence of a pattern, allowing for the detection of insights. In the example, an insight might be detected which reflects that a message containing an "acknowledge" response as the first information element in the message follows a message containing a "synchronize" request as the first information element with a very high likelihood.

The detection of insights at S450 may be achieved using the NLP technique of word embedding. The primary aim of the word embedding technique is embedding words from a natural language into low-dimensional vectors, such that a word is generally represented as a point in a vector space. Word embedding implementations are often based on the hypothesis that words in similar contexts may have similar meanings. The application of word embedding to network languages may allow for the detection of insights and the subsequent extraction of rules and identification of anomalies.

Word embedding relies on the representation of documents, paragraphs, sentences, or strings of text as vectors, where the individual vectors include component dimensions. As the component dimensions may represent descriptions of the vector in various aspects, each dimension corresponds with a separate term. Where a component word, sentence, or the like, appears in the represented document, paragraph, sentence, or string of text, the component's value within the vector is non-zero. Where words are chosen as the component dimensions of the vector, the dimensionality of the vector is equal to the number of distinct words occurring in the corpus.

Representation in low-dimensionality vectors allows for a simplification of the vector into a form where only those components necessary to describe the vector are included. Representation as a low-dimensionality vector allows for lower processing requirements for vector-to-vector comparisons, allowing for higher processing speed, volume, or both, when modeling data in vector form.

In an embodiment, word representation models requiring the creation of a vector in low-dimensionality space may make direct use of the frequencies of co-occurring words in a corpus. In a further embodiment, neural networks may be applied to directly learn low-dimensional representations.

The application of NLP word representation models allows for the detection of insights at S450. The insights detected may be complete, semi-complete, or incomplete insights regarding information elements, messages, packets, procedures, protocols, and the like. The insights detected may describe patterns occurring in the data analyzed and may include observations which could not be detected except with NLP techniques. The insights detected may be applicable to the generation of rules and the detection of anomalies at subsequent steps.

At S460, rules may be extracted from the insights detected at S450. The rules extracted at S460 may be one or more complete or semi-complete rules describing, either individually or in combination, the behaviors and patterns identified in the data received at S410. The extracted rules may be applicable to the subsequent detection of anomalies.

In an example embodiment, at S460, rules regarding communications in a mission critical network may be extracted from the insights detected at S450. Where the detection of insights at S450 indicates a high likelihood that a response packet containing an "acknowledge" response information element follows a request packet containing a "synchronize" request, a rule may be extracted that a packet containing an "acknowledge" response information element must follow a packet containing a "synchronize" request information element.

At S470, the rules extracted at S460 may be applied to the detection of anomalies. Anomalies may be detected in real-time or in the analysis of logged communication. Detection of anomalies may indicate the presence of malicious or abnormal activity. In an embodiment, the detection of anomalies at S470 may trigger the initiation of at least one response action, where a response action may include, without limitation, displaying an alert to a user/administrator, quarantining devices, resources, and processes related to the detected anomaly, passing anomalous traffic through a scrubbing center, and like techniques.

In an example, where a rule is extracted at S470 that a packet containing an information element "a" must follow a packet containing an information element "b," that rule may be applied to the detection of anomalies at S470. In the example, where a packet with an information element "b" follows a packet with an information element "c," an anomaly may be detected according to the rule extracted above. In an embodiment, the anomaly may be detected in real-time, by interception methods involving analysis of packets-in-motion. In a further embodiment, the anomaly may be detected upon analysis of a block of data entries, the block of data entries containing records of the anomalous transaction.

Figure 5A:
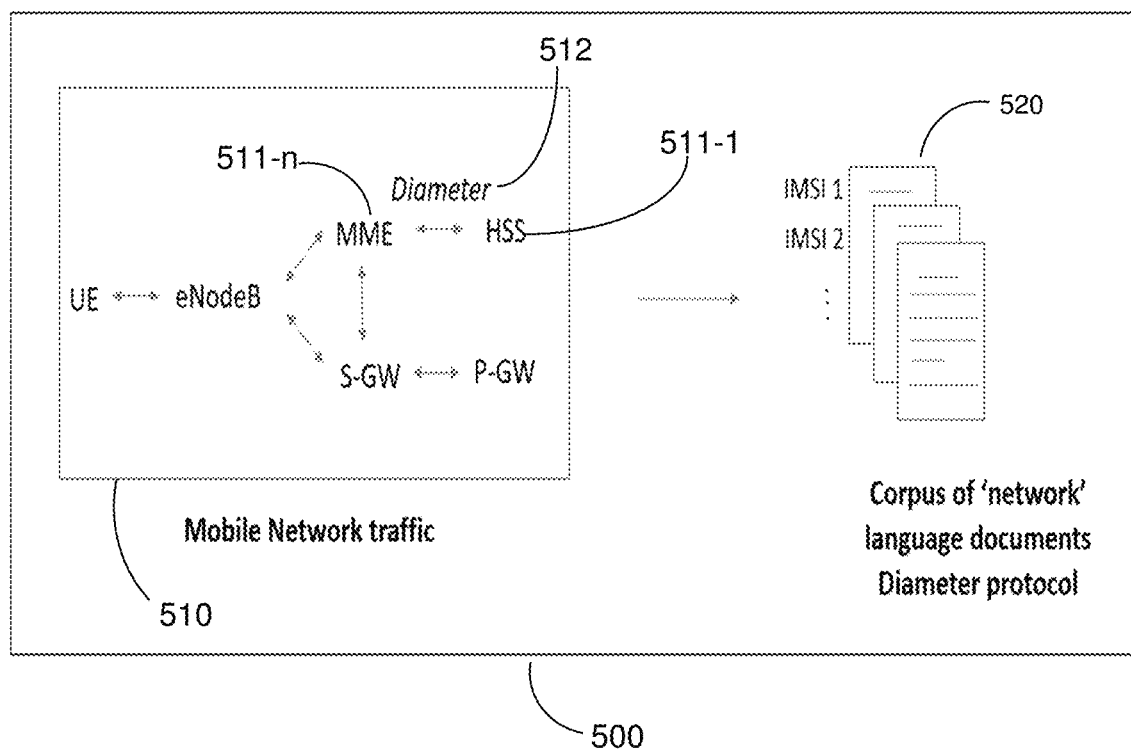
FIGS. 5A and 5B illustrate the analogy between natural language and network language, according to an embodiment.
Figure 5B:
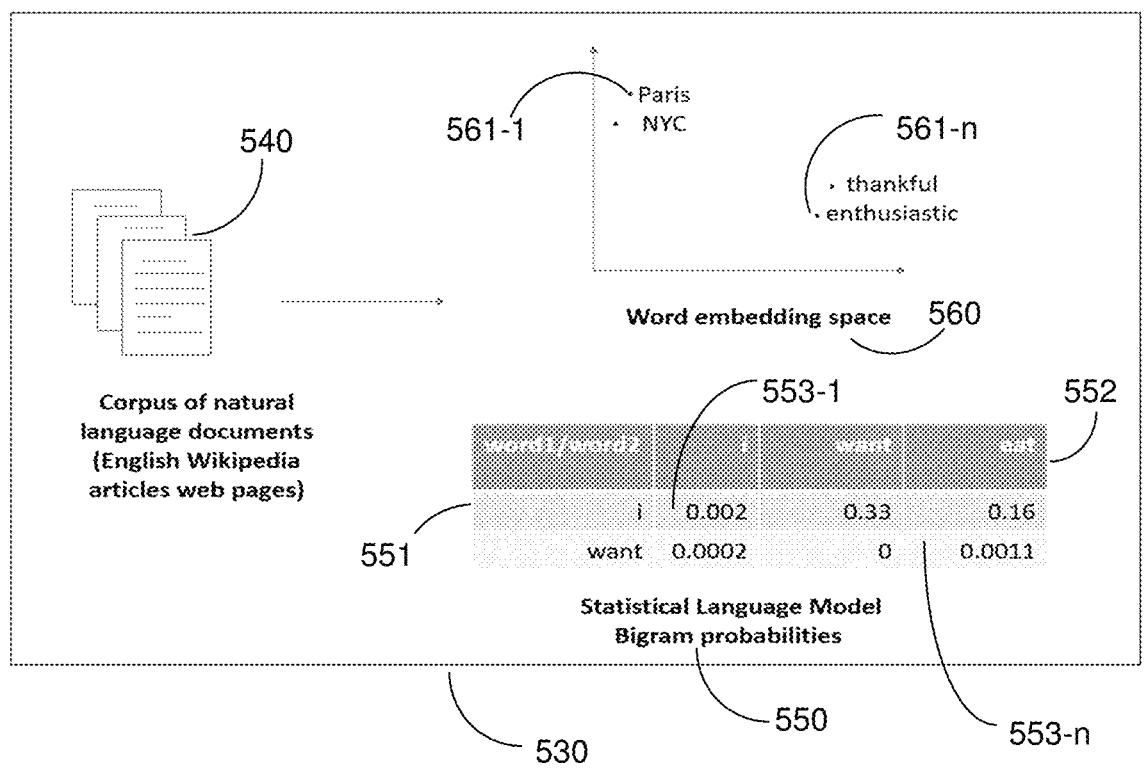

FIGS. 5A and 5B illustrate the analogy between natural language and network language.

FIG. 5A illustrates the generation process 500 for network language "documents" from captured network traffic, according to an embodiment. In an embodiment, communications across multiple protocols and for multiple users may be consolidated and simplified into network language "documents," to which NLP techniques may be applied.

In the example embodiment, the mobile network traffic 510 converted into network language "documents" 520 may be between different machines, 511-1 through 511-n, in the network and may be enabled by the use of various protocols 512. As an example, communication between an HSS machine 511-1 and an MME machine 511-n may be enabled by the Diameter protocol 512. In the example, communications between the HSS and MME machines may be, in light of the Diameter protocol "language," converted into user-specific "documents." In the example embodiment, each user-specific "document" 520 corresponds with one unique user IMSI ID.

It should be emphasized that the correspondence between network and natural languages, as illustrated above, is one possible representation of the Network Language among many possible representations.

FIG. 5B Illustrates the implementation 530 of various NLP techniques to a corpus of natural language documents, according to an embodiment. FIG. 5B illustrates the bigram probabilities 550 resulting from SLM analysis of the text 540 provided as an input. FIG. 5B also illustrates the vector space 560 resulting from the application of a word embedding model.

In the example embodiment, a corpus of natural language documents 540 may be parsed according to the NLP techniques described above, including by SLM. Under an SLM scheme, the natural language corpus 540, composed of words in one consistent language, is divided into two-word bigrams, consisting of a "prefix" 551 and a "suffix" 552. The inclusion of "prefix" 551 and "suffix" 552 designations allows the SLM model to capture the ordering of words within the corpus, preserving important contextual information. In the example embodiment, the "prefix" 551 may be the first of the two words in the bigram to appear in the sentence parsed, while the "suffix" 552 may be the word in the sentence immediately following the "prefix."

In the example embodiment, SLM parsing may be applied to generate bigram possibility estimates 553-1 through 553-n for the received corpus of text. In the example, bigrams constructed from consecutive words are compared with the corpus to determine the probabilities of certain sequences of words. Given the contents of the corpus, the example indicates a 0.33 chance that the word "I" will be followed by the word "want," while the probability of the word "want" being followed by the word "I" is given as a 0.0002 chance. Using the probabilities generated by SLM analysis, the likelihood of any one word following another in the text may be established. Using the identified probabilities, rules regarding word ordering may be established, and anomalies may be detected as violations of the rules. While this technique is exemplified with reference to a corpus of natural language documents, the method may be extended to include network language applications and applications using languages other than natural languages.

In addition to the SLM techniques discussed, NLP techniques applied to identify patterns in a corpus of language may include word embedding methods. In the application of word embedding methods, words are represented as vectors 561-1 through 561-n with at least one dimension. In an embodiment, the individual dimensions of the vector represent related words, with each word appearing at least once in the corpus having a non-zero dimension in a given vector, and the vector having a number of dimensions equal to the number of unique words in the corpus.

To simplify the pattern-isolation process, in an embodiment, word embedding methods often rely on reduction of vectors into low-dimensionality forms, allowing vectors with great similarity to map near one another in a representative vector space. The reduction of vectors into lower-dimensionality forms may include the elimination of dimensions with values, describing the individual dimension word's relation to the vector word, above a given threshold. The reduction of vectors into lower-dimensionality forms allows for the mapping of vectors with greater computational efficiency than if the vectors remained in higher-dimensionality forms.

In an embodiment, word representation models may be applied to network language implementations. The application of word representation techniques to network language implementations relies on the correspondence between natural and network languages. In the embodiment, information elements in a communication protocol may be grouped based on semantic logic. As an example, just as natural-language words can be sorted into groups describing 'food,' 'cities,' or other semantic or associative notions, network-language "words" can be grouped into semantic-bearing clusters. Through the similarities between natural language and network languages, word representation techniques may be applied to network language implementations.

In the example embodiment, the words "Paris," "NYC," "thankful," and "enthusiastic," are mapped as points in a word embedding space 560. The relative proximities of "Paris" to "NYC" and "thankful" to "enthusiastic" in the word embedding space may indicate that the words related to each plotted word, expressed as dimensions in the plotted words' vectors, bear some semantic similarity to some words and less semantic similarity to others. In the example, the depicted word embedding space plot may result from a vector analysis of a corpus which frequently refers to "Paris" and "NYC" and to "thankful" and "enthusiastic," respectively, in similar contexts. In an example, the corpus may include several text elements similar to "he went to Paris" or "she is going to NYC," or "he is feeling thankful" or "she was feeling grateful." From the example strings, vector analysis may indicate that "Paris" and "NYC" are frequently associated with words such as "going" "went," and "to," and may indicate that "thankful" and "enthusiastic" are frequently associated with words such as "feeling." Based on the vector-driven insights described, the locations of the words on the plot shows a similarity between "Paris" and "NYC" and a similarity between "thankful" and "enthusiastic."

It may be noted that the example provided in FIG. 5.B serves to illustrate an application of NLP techniques. The NLP techniques illustrated do not limit the scope of NLP techniques applicable to the described embodiments, and applications using a network language corpus or a non-natural-language corpus may be used without any loss of generality or departure from the scope of the described.

Figure 5C:
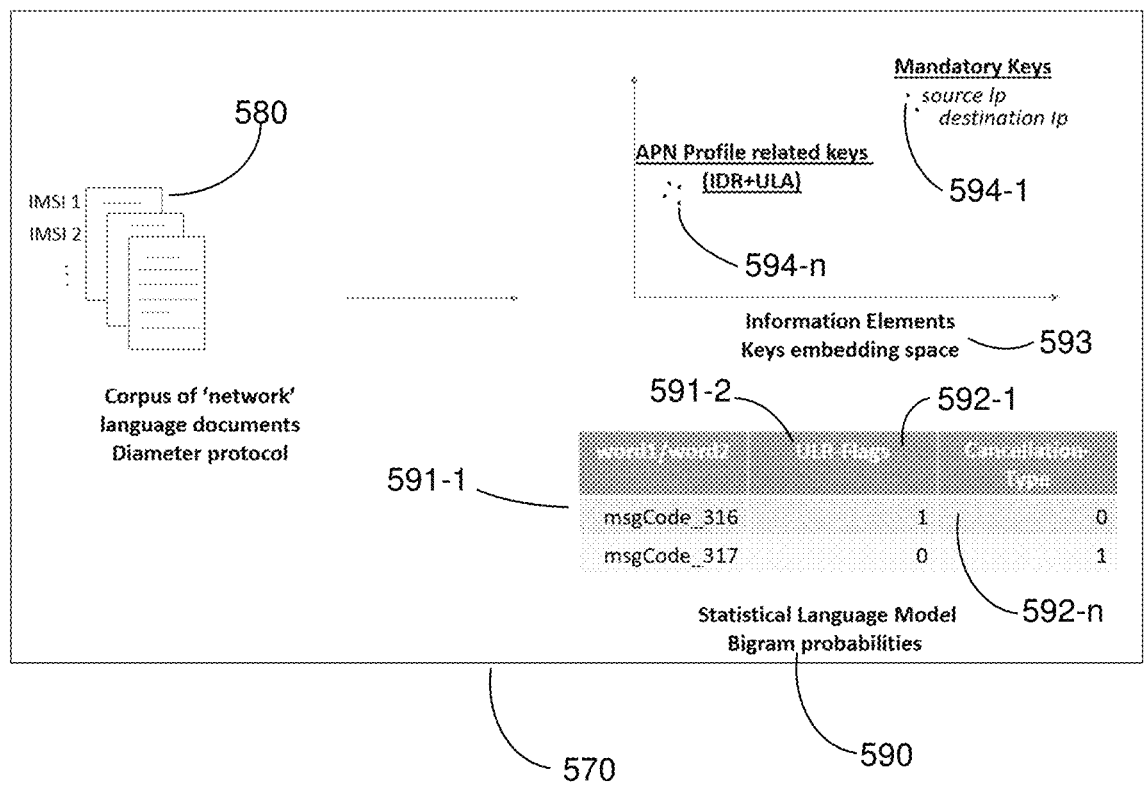
FIG. 5C is an illustration of the application of NLP techniques to a network language corpus, according to an embodiment.

FIG. 5C is an illustration 570 of the application of NLP techniques to a network language corpus. In the example embodiment, SLM and word embedding methods are applied to extract insights from the corpus 580. The network language corpus 580 includes multiple documents corresponding to individual users, represented as IMSI 1 and IMSI 2. Further, instead of words, sentences, and paragraphs, the network language corpus includes information elements, packets, and procedures, respectively. In the example embodiment, information elements are extracted from the corpus and parsed using NLP techniques.

In the example embodiment, SLM, a statistical NLP technique involving the creation of n-grams from keys in the same packet or message, is applied to estimate the bigram probabilities 590 that one information element 591-1 will co-occur with another information element 591-$n$. In the example embodiment, SLM techniques are applied to bigrams constructed from information element keys contained in the same packet or message. In the example embodiment, an SLM analysis, of the type described above, indicates a probability 592-1 of 1 that a message containing msgCode_316 will contain a ULR-Flag, and a zero probability 592-$n$ that a message will appear containing a "Cancellation Type" key. Furthermore, the SLM analysis described indicates a probability of zero that a message containing msgCode_317, which corresponds with a "Cancel Location Request" message will contain a ULR-Flag, and a probability of 1 that, when a message containing msgCode_317 appears, it will also contain another key, "Cancellation Type." These insights may be converted into rules for the subsequent detection of anomalies.

Further, in the example embodiment, a word embedding method is applied to map information elements as vectors 594-1 through 594-$n$ within an information element key embedding space 593. By treating the individual information elements contained in the corpus as "words," word embedding methods may be applied to generate a vector-space representation of the network-language words. In the example generated by applying the word embedding techniques described above to a network language corpus, two distinct clusters of information element vectors emerge.

The first cluster of APN profile-related keys contains four elements, each related more closely to the others within the cluster than to the elements of the second cluster. The second cluster, labeled "mandatory" keys, contains two elements, a source IP and a destination IP. While the source and destination IPs refer to different entities, here, machines having unique IP addresses, the source and destination IPs are more closely related to one another, per the word embedding model, than they are to the other elements depicted. Therefore, two distinct clusters of elements emerge in the example application of word embedding techniques to the network language corpus.

Figure 6:
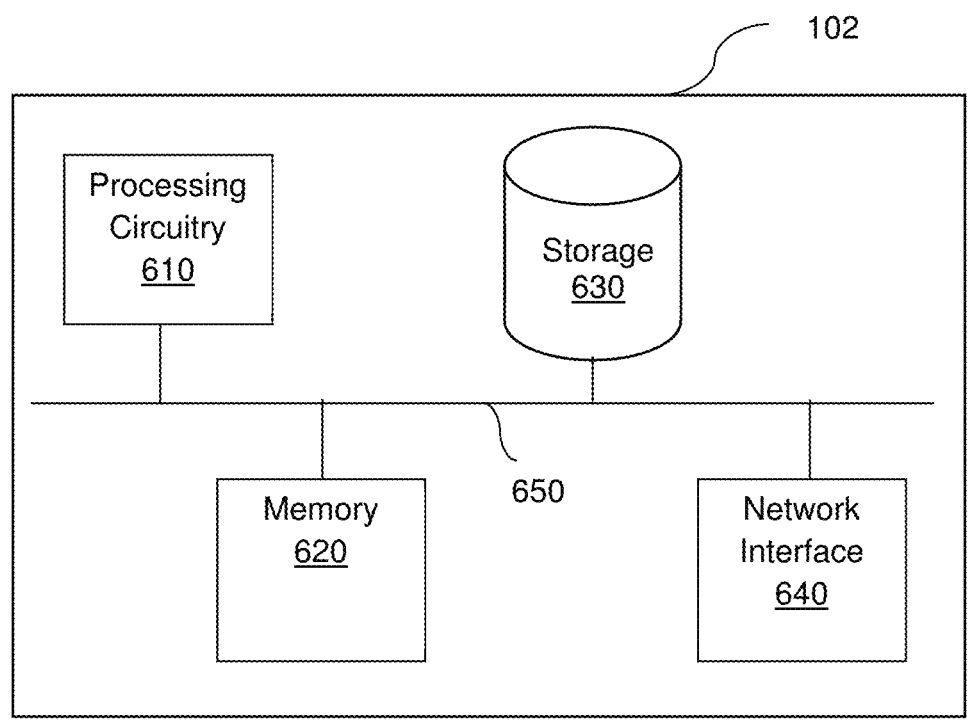
FIG. 6 is an example schematic diagram of a system, according to an embodiment.

FIG. 6 is an example schematic diagram of a system 120 according to an embodiment. The system 120 includes a processing circuitry 610 coupled to a memory 620, a storage 630, and a network interface 640. In an embodiment, the components of the system 120 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 620 may be volatile (e.g., RAM, etc.), non-volatile (e.g., ROM, flash memory, etc.), or a combination thereof. In one configuration, computer readable instructions to implement one or more embodiments disclosed herein may be stored in the storage 630.

In another embodiment, the memory 620 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, CD-ROM, Digital Versatile Disks (DVDs), or any other medium which can be used to store the desired information.

The network interface 640 allows the system 120 to communicate with the other elements for the purpose of, for example, receiving data, sending data, and the like. Further, the network interface 640 allows the system 120 to communicate with the machines 110 for the purpose of collecting data.

It should be understood that the embodiments described herein are not limited to the specific architecture illustrated in FIG. 6, and other architectures may be equally used without departing from the scope of the disclosed embodiments.

It may be noted that the implementations, embodiments, and the like described above may be applicable to APIs, API communications, and other aspects of API implementation without departing from the scope of the disclosed. In an embodiment, the methods, techniques, and the like described may be applied to detection of anomalous business logic behaviors in an API-driven exchange, rather than the detection of anomalous communications within a communication protocol. In such an embodiment, the detection of anomalous business logic behaviors may be applicable to any API protocol, including domain-specific protocols such as diameter protocols, and web API protocols, such as REST/JSON.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting anomalies in mission-critical environments, comprising:
    parsing a received data set into a text structure, wherein the received data set comprises data regarding a network communication procedure between a plurality of user devices;
    isolating a protocol language of the received data set, wherein the protocol language is a standardized pattern for implementing the network communication procedure;
    generating a document from the received data set,
        wherein the document includes a parsed text structure referencing a unique identifier, and
        wherein generating further comprises: the at least one parsed text structure is organized within the at least one document according to a natural language scheme;
    organizing, in light of the protocol language, the parsed text structure into a natural language scheme in the document;
    detecting insights in the document;
    extracting rules from the insights; and
    detecting anomalies by applying the rules.

2. The method of claim 1, wherein detecting insights in the document further comprises:
    applying a natural language processing (NLP) technique to the document.

3. The method of claim 2, wherein the natural language processing (NLP) technique includes at least statistical language modeling (SLM).

4. The method of claim 2, wherein the natural language processing (NLP) technique includes at least word embedding.

5. The method of claim 1, wherein the received data set includes application programming interface (API) communications.

6. The method of claim 5,
    wherein the document comprises records and
    wherein parsing the received data set further comprises:
        parsing the records as any one of: sentences, words information elements, data units, and parsing procedures or sequences involving data packets or messages as paragraphs, wherein paragraphs contain sentences and sentences contain words.

7. The method of claim 1, wherein isolating the protocol language of the received data set further comprises: identifying pre-defined messages, procedures, and sessions for a protocol.

8. The method of claim 1, wherein generating the document further comprises:
identifying unique identifiers in the received data set; and
creating separate documents containing records relating to each identified unique identifier.

9. The method of claim 1, wherein the at least one received set is for a mission critical environment and wherein detecting insights in the document is based on the protocol language.

10. A non-transitory computer readable medium having stored thereon instructions for causing a processing circuitry to execute a process for detecting anomalies in mission-critical environments, the storing program code which, when executed, performs a process comprising:
parsing a received data set into a text structure, wherein the received data set comprises data regarding a network communication procedure between a plurality of user devices;
isolating a protocol language of the received data set, wherein the protocol language is a standardized pattern for implementing the network communication procedure;
generating a document from the received data set, wherein the document includes at least one a parsed text structure referencing a unique identifier, and wherein generating further comprises:
organizing, in light of the protocol language, the parsed text structure into a natural language scheme in the document;
detecting insights in the document;
extracting rules from the insights; and
detecting anomalies by applying the rules.

11. A system for detecting anomalies in mission-critical environments, comprising:
a processing circuitry; and
a memory, the memory containing instructions that, when executed by the processing circuitry, configure the system to:
parse a received data set into a text structure, wherein the received data set comprises data regarding a network communication procedure between a plurality of user devices;

isolate a protocol language of the received data set, wherein the protocol language is a standardized pattern for implementing the network communication procedure;
generate a document from the received data set, wherein the document includes a parsed text structure referencing a unique identifier, and wherein generating further comprises:
organizing, in light of the protocol language, the parsed text structure into a natural language scheme in the document;
detect insights in the document;
extract rules from the insights; and
detect anomalies by applying the rules.

12. The system of claim 11, wherein the system is further configured to:
apply a natural language processing (NLP) technique to the document.

13. The system of claim 12, wherein the natural language processing (NLP) technique includes at least statistical language modeling (SLM).

14. The system of claim 12, wherein the natural language processing (NLP) technique includes at least word embedding.

15. The system of claim 11, wherein the received data set includes application programming interface (API) communications.

16. The system of claim 15,
wherein the document comprises records, and
wherein the system is further configured to:
parse the records as any one of: sentences, words information elements, data units, and parsing procedures or sequences involving data packets or messages as paragraphs, wherein paragraphs contain sentences and sentences contain words.

17. The system of claim 11, wherein the system is further configured to:
identify pre-defined messages, procedures, and sessions for a protocol.

18. The system of claim 11, wherein the system is further configured to:
identify unique identifiers in the received data set and create separate documents containing records relating to each identified unique identifier.

* * * * *